(12) United States Patent
Tanimoto et al.

(10) Patent No.: US 8,675,807 B2
(45) Date of Patent: Mar. 18, 2014

(54) BASKET AND PH ADJUSTING DEVICE

(75) Inventors: Koichi Tanimoto, Hyogo (JP);
Masaharu Watabe, Hyogo (JP); Jiro Kasahara, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 831 days.

(21) Appl. No.: 12/867,976

(22) PCT Filed: Apr. 8, 2009

(86) PCT No.: PCT/JP2009/057204
§ 371 (c)(1),
(2), (4) Date: Aug. 17, 2010

(87) PCT Pub. No.: WO2009/125792
PCT Pub. Date: Oct. 15, 2009

(65) Prior Publication Data
US 2010/0329410 A1 Dec. 30, 2010

(30) Foreign Application Priority Data

Apr. 10, 2008 (JP) ................................ 2008-102838

(51) Int. Cl.
*G21C 1/01* (2006.01)
(52) U.S. Cl.
USPC ......................................... 376/306; 376/305
(58) Field of Classification Search
USPC .................................. 376/305, 306; 210/634
See application file for complete search history.

(56) References Cited

U.S. PATENT DOCUMENTS

| 4,609,523 A | * | 9/1986 | Gerlowski | 376/309 |
| 5,295,170 A | * | 3/1994 | Schulz | 376/309 |
| 2004/0050781 A1 | * | 3/2004 | Coffey et al. | 210/634 |

FOREIGN PATENT DOCUMENTS

| EP | 0195214 | * | 1/1989 |
| EP | 0195214 B1 | | 1/1989 |
| JP | 61-189499 A | | 8/1986 |
| JP | 61189499 | * | 8/1986 |

(Continued)

OTHER PUBLICATIONS

J.A. Reinhart, Fort Calhoun Station, Unit No. 1 License Amendment Request (LAR) "Change of Containment Building Sump Buffering Agent from Trisodium Phosphate to Sodium Tetraborate," NRC Public Documents, Aug. 21, 2006, <http://www.nrc.gov>.*

(Continued)

*Primary Examiner* — Jack W Keith
*Assistant Examiner* — Sean P Burke
(74) *Attorney, Agent, or Firm* — Westerman, Hattori, Daniels & Adrian, LLP

(57) ABSTRACT

Disclosed is a basket 50 that is located within a basket containment vessel, into which a boric acid solution capable of dissolving a pH adjuster flows, and can allow a pH adjuster solution to flow out by the inflowing boric acid solution. The basket 50 includes a plurality of containment units 71 stacked in a vertical direction with a predetermined first space L1 therebetween. The pH adjuster can be stored in each of the containment units 71. Also disclosed is a pH adjusting device including the basket 50, the basket containment vessel in which the basket 50 can be contained and in which cooling water can be stored, and an overflow pipe that, within the basket containment vessel, allows the pH adjuster solution that is obtained from the pH adjuster dissolved in the cooling water to flow out.

9 Claims, 11 Drawing Sheets

(56) References Cited

FOREIGN PATENT DOCUMENTS

| | | | |
|---|---|---|---|
| JP | 62-115394 A | | 5/1987 |
| JP | 62115394 | * | 5/1987 |
| JP | 63-215993 A | | 9/1988 |
| JP | 63215993 | * | 9/1988 |
| JP | 04-194791 A | | 7/1992 |
| JP | 04194791 | * | 7/1992 |
| JP | 6-258479 A | | 9/1994 |
| JP | 6258479 | * | 9/1994 |
| JP | 6-317690 A | | 11/1994 |
| JP | 6317690 | * | 11/1994 |
| KR | 1991-008357 | * | 10/1991 |
| KR | 1991-008357 B1 | | 10/1991 |
| KR | 10-2010-0033529 A | | 3/2010 |
| KR | 10-2010-0033531 A | | 3/2010 |
| KR | 1020100033529 | * | 3/2010 |
| KR | 1020100033531 | * | 3/2010 |

OTHER PUBLICATIONS

Korean Office Action dated Feb. 6, 2012, issued in corresponding Korean Patent Application No. 10-2010-7022498.

J. A. Reinhart, Fort Calhoun Station, Unit No. 1 License Amendment Request (LAR) "Change of Containment Building Sump Buffering Agent from Trisodium Phosphate to Sodium Tetraborate," NRC Public Documents, Aug. 21, 2006, <http://www.nrc.gov>.

International Search Report of PCT/JP2009/057204, Mailing Date of Jun. 9, 2009.

Japanese Notice of Allowance dated Sep. 25, 2012, issued in corresponding Japanese patent application No. 2008-102838, w/ English translation.

Korean Notice of Allowance dated Sep. 24, 2012, issued in corresponding Korean patent application 10-2010-7022498, w/ English translation.

Chinese Office Action dated Oct. 30, 2012, issued in corresponding Chinese Patent Application No. 200980111366.3.

* cited by examiner

BASKET AND PH ADJUSTING DEVICE

TECHNICAL FIELD

The present invention relates to a pH adjusting basket and a pH adjusting device for adjusting pH in a reactor containment vessel at the time of an unusual event of a nuclear reactor contained in the reactor containment vessel.

BACKGROUND ART

As a common nuclear power plant, a plant including a pressurized water reactor has been known, in which the pressurized water reactor is contained in a reactor containment vessel. In this case, with an assumption of an unusual event, a spray device that sprays cooling water in the reactor containment vessel is provided around the reactor containment vessel to reduce pressure in the reactor containment vessel.

In such nuclear power plants, it is known that a mesh basket in which a pH adjuster such as trisodium phosphate (TSP) is stored is located on a ground level (above the floor) near the external wall (for example, Nonpatent Literature 1).

With this configuration, at the time of an unusual event, cooling water is sprayed by the spray device, and the bottom of the reactor containment vessel is filled with the cooling water. The basket located above the floor in the reactor containment vessel is then inundated by the cooling water, and the pH adjuster stored in the basket is dissolved in the cooling water through the mesh. Thereafter, the cooling water in which the pH adjuster is dissolved (a pH adjuster solution) is circulated in the reactor containment vessel by the spray device, thus making it possible to adjust the pH level in the reactor containment vessel.

By adjusting the pH level in the reactor containment vessel, it is possible to hold radioactive iodine inside the reactor containment vessel in the pH adjuster solution or to suppress degradation of durability of structural material or various devices in the reactor containment vessel due to oxidization.

PRIOR ART DOCUMENT

Patent Document

Nonpatent Literature 1: J. A. Reinhart, Site Director/Fort Calhoun Station, "Fort Calhoun Station, Unit No. 1 License Amendment Request (LAR) "Change of Containment Building Sump Buffering Agent from Trisodium Phosphate to Sodium Tetraborate"", [online], Aug. 21, 2006, U.S. NRC, [Searched on Mar. 10, 2008], Internet <URL:http://www.nrc.gov/→Select "Electronic Reading Room" →Select "Documents in ADAMS"→Select "Web-based access"→Select "Begin ADAMS Search"→Input "ML062340039"→Select "Rank 6. (80)">

DISCLOSURE OF INVENTION

Problem to be Solved by the Invention

To settle down the unusual event quickly, it is required to circulate the pH adjuster solution in the reactor containment vessel by the spray device as quickly as possible. For this reason, it is preferable to speed up the rate of solution of the pH adjuster dissolved from the basket inundated by cooling water. However, the configuration of the basket according to Nonpatent Literature 1 has not been disclosed.

Therefore, an object of the present invention is to provide a basket and a pH adjusting device that can speed up the rate of solution of a pH adjuster.

MEANS FOR SOLVING PROBLEM

Effect of the Invention

According to the basket of claim 1, because it is possible to cause the cooling water to flow into the fist space between the containment units by providing a plurality of containment units for storing a pH adjuster in a stacked manner in a vertical direction, it is possible to increase a contact dimension between the cooling water and the pH adjuster. Therefore, because it is possible to speed up the rate of solution of the pH adjuster, it is possible to perform a circulation of the pH adjuster solution in the reactor containment vessel quickly, and as a result, it is possible to settle down the unusual event quickly.

According to the basket of claim 2, it is possible to partition a plurality of containment units by using a plurality of partition plates. Therefore, it is possible to suppress inflow of a pH adjuster solution of high concentration produced in each of the containment units to other containment units through the space between the containment units. With this configuration, because the cooling water other than the pH adjuster solution of high concentration flows into other containment units, a saturation of the pH adjuster solution hardly occurs in the containment units, which makes it possible to appropriately dissolve the pH adjuster.

According to the basket of claim 3, because each of the partition plates is arranged in an inclined manner with respect to the horizontal plane, it is possible to lead the pH adjuster solution produced in each of the containment units from the upper side end toward the lower side end, and as a result, it is possible to cause the pH adjuster solution to flow out in a preferable manner.

According to the basket of claim 4, by providing the inflow guide plate, it is possible to guide the cooling water other than the pH adjuster solution of high concentration produced in other containment units to appropriately flow into each of the containment units.

According to the basket of claim 5, by providing the outflow guide plate, it is possible to guide the pH adjuster solution of high concentration produced in each of the containment units to appropriately flow out from each of the containment units so that the pH adjuster solution does not flow into other containment units.

According to the basket of claim 6, because it is possible to cause the cooling water to flow into the second space between the divided containment units, it is possible to increase a contact dimension between the cooling water and the pH adjuster. Therefore, because it is possible to speed up the rate of solution of the pH adjuster, it is possible to perform a circulation of the pH adjuster solution in the reactor containment vessel quickly, and as a result, it is possible to settle down the unusual event quickly.

According to the basket of claim 7, because a plurality of second spaces are formed along the direction of flow of the pH adjuster solution, the cooling water flows into each of the divided containment units through each of the second spaces, and the pH adjuster solution produced in each of the divided containment units flows out through each of the second spaces. Therefore, because it is possible to obtain efficient inflow of the cooling water and efficient outflow of the produced pH adjuster solution, it is possible to speed up the rate of solution of the pH adjuster.

According to the pH adjusting device of claim 8, it is possible to produce the pH adjuster solution by dissolving the pH adjuster in the cooling water in the cooling water inflow vessel by causing the cooling water to flow into the cooling water inflow vessel and to cause the produced pH adjuster solution to flow out. As a result, it is possible to circulate the produced pH adjuster solution in the reactor containment vessel.

BEST MODE(S) FOR CARRYING OUT THE INVENTION

Exemplary embodiments of a nuclear power plant that employs a basket and a pH adjusting device according to the present invention will be explained below in detail with reference to the accompanying drawings. The present invention is not limited to the embodiments.

First Embodiment

A nuclear power plant according to a first embodiment employs a pressurized water reactor (PWR) as a nuclear reactor. The pressurized water nuclear power plant heats light water that works as a primary coolant in a nuclear reactor, and then sends the heated light water to a steam generator by a pump. Thereafter, the nuclear power plant evaporates a second coolant by heat exchange between the heated light water and the second coolant in the steam generator, and performs a power generation by sending evaporated second coolant (steam) to a turbine to drive a power generator.

Figure 1:
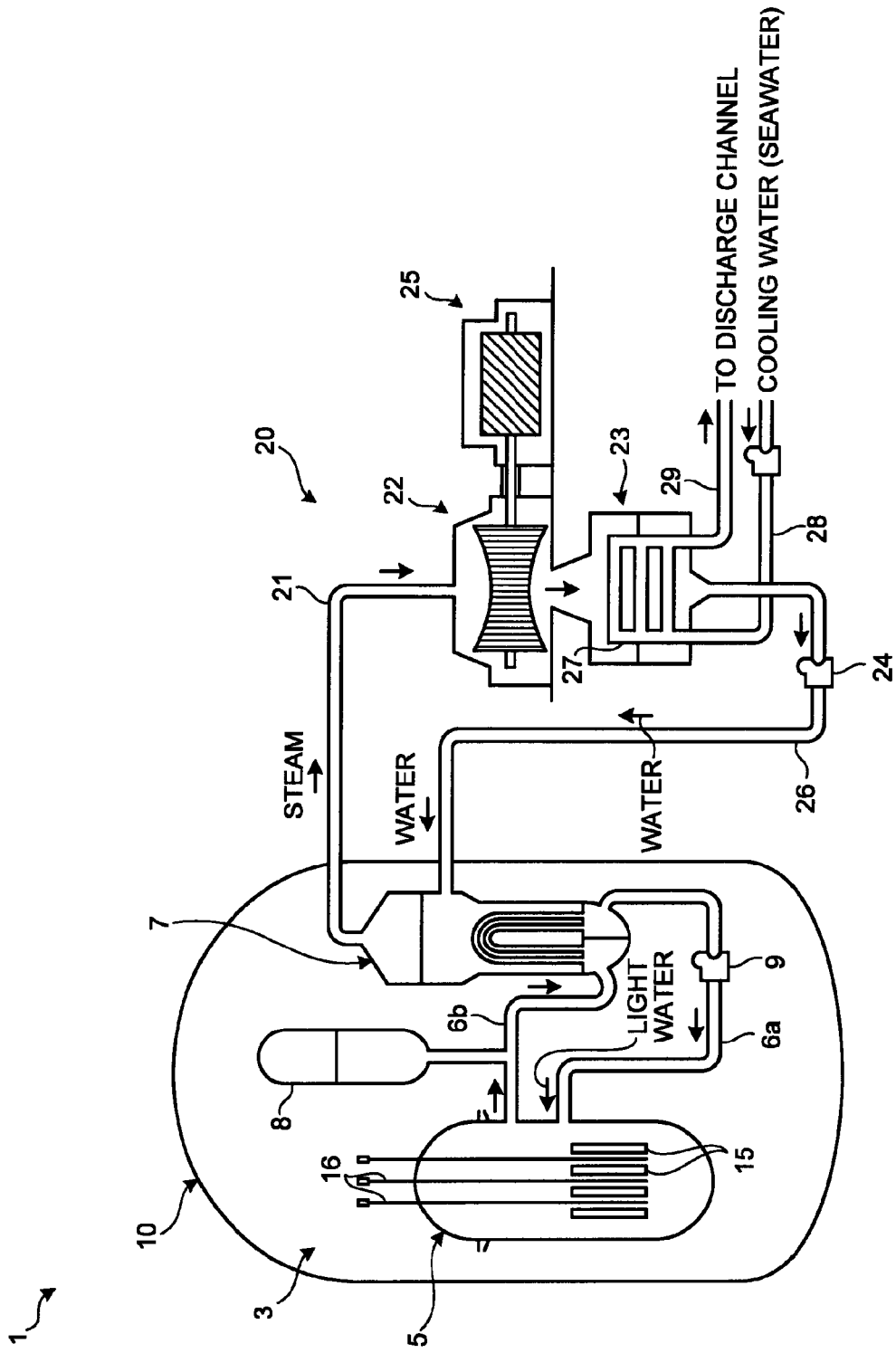
FIG. 1 is a schematic configuration diagram of a nuclear power plant that employs a basket according to a first embodiment.
Figure 2:
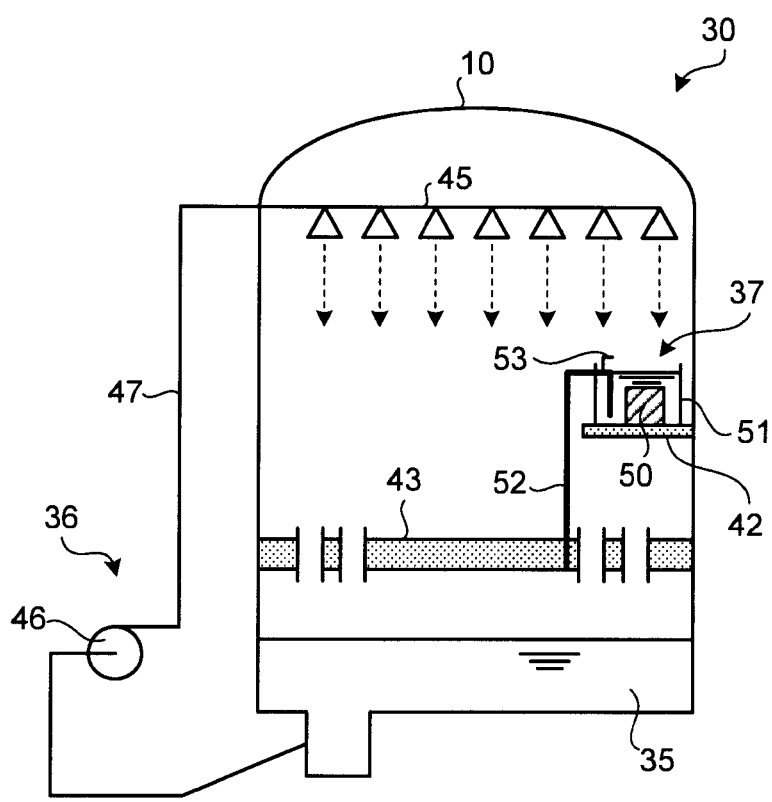
FIG. 2 is a schematic configuration diagram of a pH adjusting system that employs the basket according to the first embodiment.
Figure 3:
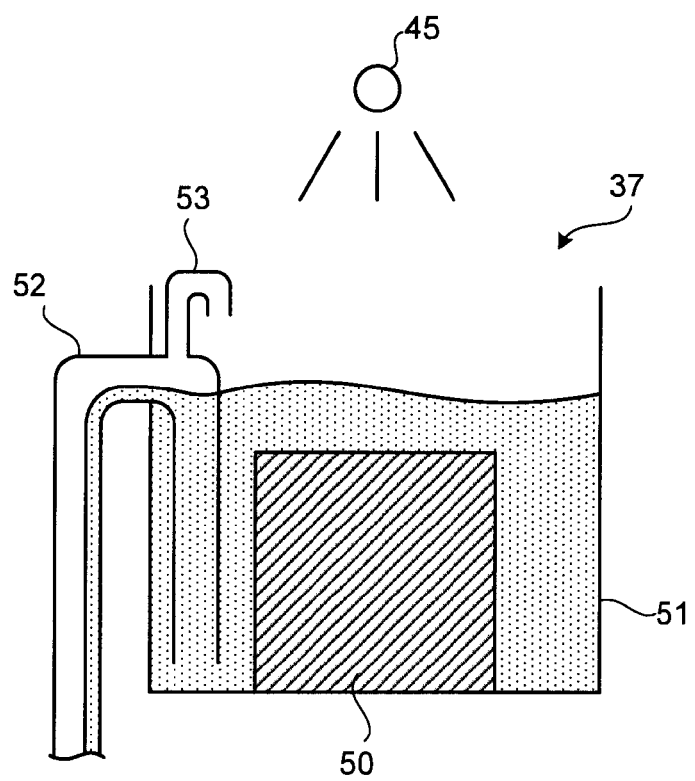
FIG. 3 is a schematic configuration diagram of a pH adjusting device including the basket according to the first embodiment.
Figure 4:
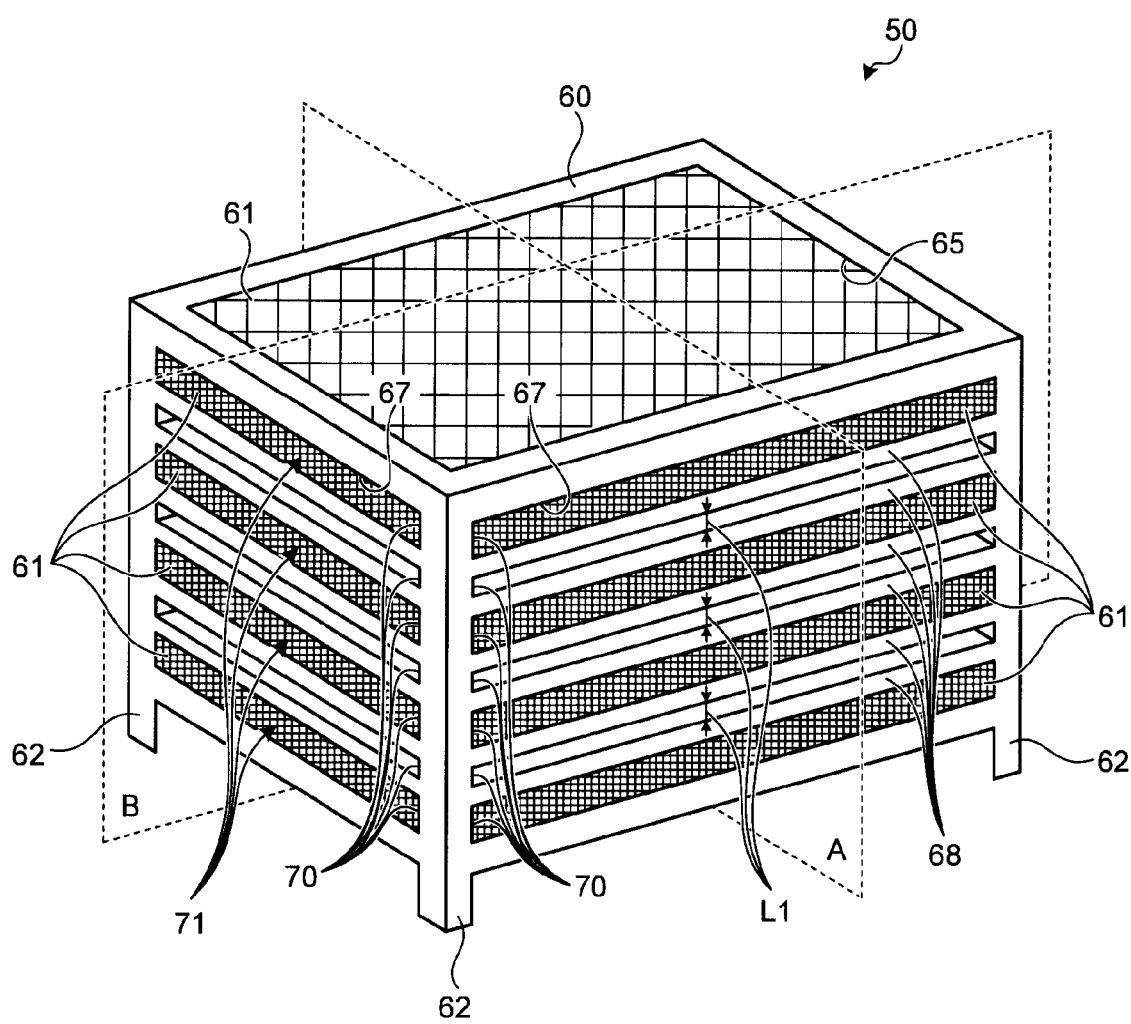
FIG. 4 is an external perspective view of the basket according to the first embodiment.
Figure 5:
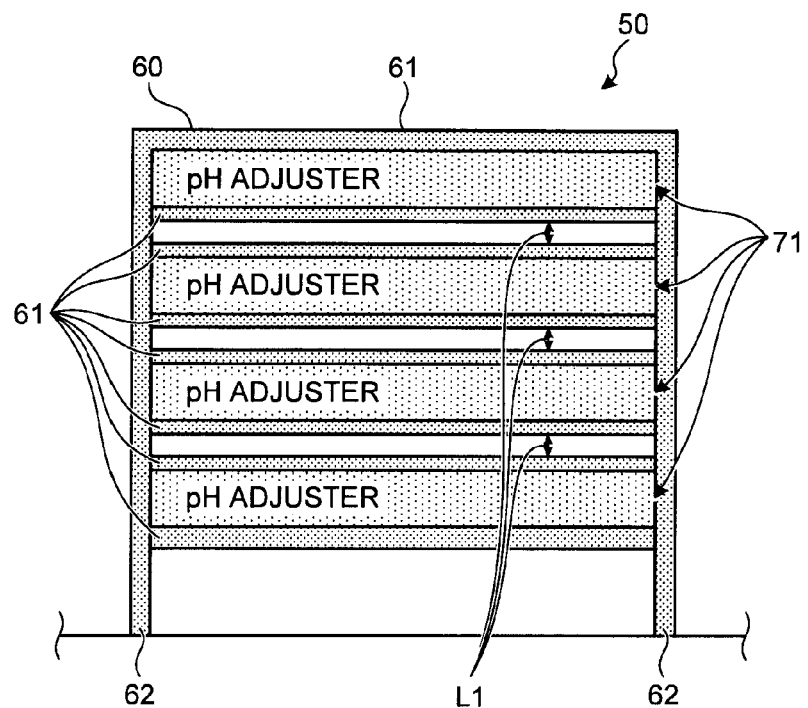
FIG. 5 is a cross section of the basket cut on a plane A shown in FIG. 4.
Figure 6:
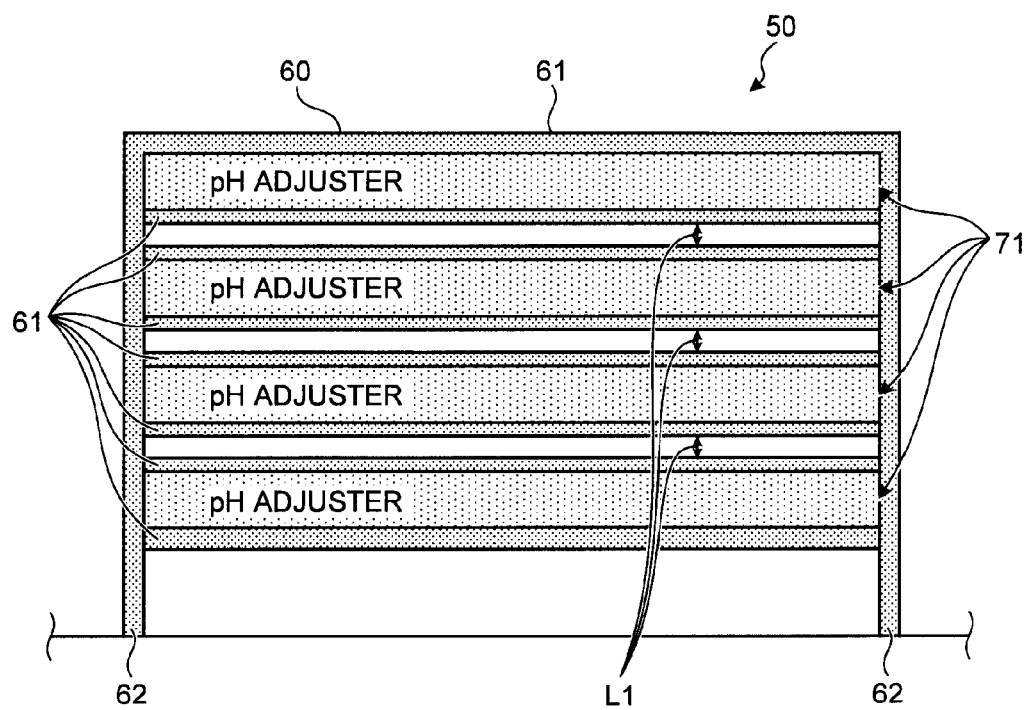
FIG. 6 is a cross section of the basket cut on a plane B shown in FIG. 4.

FIG. 1 is a schematic configuration diagram of a nuclear power plant that employs a basket according to the first embodiment, and FIG. 2 is a schematic configuration diagram of a pH adjusting system that employs the basket according to the first embodiment. FIG. 3 is a schematic configuration diagram of a pH adjusting device including the basket according to the first embodiment, and FIG. 4 is an external perspective view of the basket according to the first embodiment. FIG. 5 is a cross section of the basket cut on a plane A shown in FIG. 4, and FIG. 6 is a cross section of the basket cut on a plane B shown in FIG. 4. A configuration of the nuclear power plant is briefly explained first with reference to FIG. 1.

As shown in FIG. 1, a nuclear power plant 1 includes a nuclear reactor 5 and a steam generator 7 that is connected to the nuclear reactor 5 via a pair of coolant pipes 6a and 6b constituted by a cold leg 6a and a hot leg 6b. A pressurizer 8 is installed on the hot leg 6b of the pair of coolant pipes 6a and 6b, and a coolant pump 9 is installed on the cold leg 6a. A primary cooling system 3 is formed with the nuclear reactor 5, the pair of coolant pipes 6a and 6b, the steam generator 7, the pressurizer 8, and the coolant pump 9, which are contained in a reactor containment vessel 10.

In the above configuration, the light water that works as the primary coolant flows into the steam generator 7 from the nuclear reactor 5 through the hot leg 6b, and thereafter the light water that flows out through the steam generator 7 flows into the nuclear reactor 5 through the cold leg 6a. That is, the light water circulates between the nuclear reactor 5 and the steam generator 7. A boric acid is dissolved in the light water to reduce the speed of neutrons generated by a nuclear fission reaction undergoing in the nuclear reactor 5, which makes the light water acidic. That is, the light water is used as a coolant and a neutron moderator.

The nuclear reactor 5 is a pressurized water reactor as described above, and the inside thereof is filled with the light water. In the nuclear reactor 5, a fuel bundle 15 is contained, and at the same time, a plurality of control rods 16 for controlling the nuclear fission of the fuel bundle 15 are provided in a manner such that the control rods 16 can be inserted into the fuel bundle 15.

When a nuclear fission of the fuel bundle 15 is performed while controlling the nuclear fission reaction with the control rods 16, a thermal energy is generated by the nuclear fission. The generated thermal energy heats the light water, and the heated light water is sent to the steam generator 7 through the hot leg 6b. Meanwhile, the light water sent from the steam generator 7 through the cold leg 6a flows into the nuclear reactor 5 to cool down the inside of the nuclear reactor 5.

The pressurizer 8 installed on the hot leg 6b suppresses boiling of the light water by pressurizing the heated light water. The steam generator 7 evaporates a second coolant to generate a steam and cools down the hot pressurized light water by heat exchange between the hot pressurized light water with the second coolant. The coolant pump 9 circulates the light water in a loop of the primary cooling system 3, sending the light water from the steam generator 7 into the nuclear reactor 5 through the cold leg 6a and sending the light water from the nuclear reactor 5 into the steam generator 7 through the hot leg 6b.

A series of operations in the primary cooling system 3 of the nuclear power plant 1 is explained below. When the light water is heated by the thermal energy generated by the nuclear fission reaction in the nuclear reactor 5, the heated light water is sent to the steam generator 7 through the hot leg 6b by the coolant pump 9. The hot light water passing through the hot leg 6b is pressurized by the pressurizer 8 to suppress its boiling, and flows into the steam generator 7 in a high temperature and a high pressure condition. The hot pressurized light water that flows into the steam generator 7 is cooled down by a heat exchanged with the second coolant, and the cooled light water is sent to the nuclear reactor 5 through the cold leg 6a by the coolant pump 9. By the cooled light water that flows into the nuclear reactor 5, the nuclear reactor 5 is cooled down.

The nuclear power plant 1 further includes a turbine 22 that is connected to the steam generator 7 via a steam pipe 21, a water condenser 23 that is connected to the turbine 22, and a water feed pump 24 installed on a water condensing and feed pipe 26 that connects the water condenser 23 and the steam generator 7, by which a secondary cooling system 20 is formed. The secondary coolant circulating through the secondary cooling system 20 is evaporated in the steam generator 7 to be a vapor (steam), and is turned back into a liquid from the vapor in the water condenser 23. A power generator 25 is connected to the turbine 22.

The steam that flows into the turbine 22 from the steam generator 7 through the steam pipe 21 causes the turbine 22 to rotate. When the turbine 22 rotates, the power generator 25 connected to the turbine 22 generates a power. Thereafter, the steam that flows out from the turbine 22 flows into the water condenser 23. The water condenser 23 includes a cooling pipe 27 therein. A water intake pipe 28 for supplying cooling water (for example, seawater) is connected to one end of the cooling pipe 27, and a drain pipe 29 for draining away the cooling water is connected to the other end of the cooling pipe 27. With this configuration, the water condenser 23 turns the steam into the liquid by cooling down the steam that flows from the turbine 22 by the cooling tube 27. The secondary coolant turned into the liquid is sent to the steam generator 7 through the water condensing and feed pipe 26 by the water feed pump 24. The secondary coolant sent to the steam generator 7 is turned into the steam again by a thermal exchange with the primary coolant in the steam generator 7.

With an assumption of an unusual event, a pH adjusting system 30 is incorporated in the nuclear power plant 1 to cool down the inside of the reactor containment vessel 10 and suppress volatilization of the radioactive iodine and degradation of durability of the structural material and the like. The pH adjusting system 30 according to the first embodiment is briefly explained below with reference to FIGS. 2 and 3.

As described above, the pH adjusting system 30 is for cooling down the inside of the reactor containment vessel 10 and suppressing the volatilization of radioactive iodine and the degradation of durability of the structural material and the like at the time of an unusual event. As shown in FIG. 2, the pH adjusting system 30 includes the reactor containment vessel 10 described above, a fuel-replacement water pit 35 provided on the bottom of the reactor containment vessel 10, a spray device 36 configured to spray a boric acid solution (cooling water) stored in the fuel-replacement water pit 35 on the inside of the reactor containment vessel 10, and a pH adjusting device 37 for adjusting pH in the reactor containment vessel 10.

As shown in FIG. 2, an inspection stage 42 for placing the pH adjusting device 37 thereon is provided on the inside wall of the reactor containment vessel 10. The inspection stage 42 is formed with a grating and the like. Furthermore, in the reactor containment vessel 10, a work floor 43 is provided above the fuel-replacement water pit. A returned water pipe path is formed on the work floor 43, such that the boric acid solution sprayed from a spray ring 45 (described later in detail) of the spray device 36 is returned to the fuel-replacement water pit 35.

The fuel-replacement water pit 35 is provided on the bottom of the reactor containment vessel 10. The inside of the fuel-replacement water pit 35 is constantly filled with the boric acid solution. Normally, the boric acid solution is used when replacing the fuel bundle 15 described above. However, the boric acid solution is also used as cooling water for cooling down the inside of the reactor containment vessel 10 at the time of an unusual event of the nuclear reactor 5. In addition, the boric acid solution is also used as a solvent for a pH adjuster that is described later.

The spray device 36 includes the spray ring 45 mounted near the inside ceiling of the reactor containment vessel 10, a spray pipe 47 that connects the spray ring 45 and the fuel-replacement water pit 35, and a spray pump 46 installed on the spray pipe 47. Therefore, when the spray device 36 is activated, the spray pump 46 pumps the boric acid solution stored in the fuel-replacement water pit 35 to the spray ring 45, and the boric acid solution is spray on the inside of the reactor containment vessel 10 from the spray ring 45. At this time, the boric acid solution sprayed from the spray ring 45 flows into the pH adjusting device 37.

As shown in FIG. 3, the pH adjusting device 37 is mounted at an arbitrary position of the inspection stage 42. Specifically, the pH adjusting device 37 is positioned above the fuel-replacement water pit 35 and right below the spray ring 45 (see FIG. 2). The pH adjusting device 37 includes the pH adjuster, a basket 50 that contains the pH adjuster, a basket containment vessel 51 (a cooling water inflow vessel) that contains the basket 50, an overflow pipe 52 (a cooling water outflow unit) provided on the basket containment vessel 51, and a vent pipe 53 provided on the overflow pipe 52.

As the pH adjuster, for example, sodium tetraborate decahydrate (NaTB) is used, which is made in the form of powder to be easily dissolved in the boric acid solution. Although NaTB is used as the pH adjuster in the first embodiment, which is not limited to, trisodium phosphate (TSP) and the like can be also used.

The basket containment vessel 51 is formed in a box shape with its top surface opened, in which the basket 50 is contained. At this time, the number of the baskets 50 to be contained in the basket containment vessel is an arbitrary number. Therefore, when the boric acid solution is sprayed from the spray ring 45 that is located right above onto the basket containment vessel 51, the sprayed boric acid solution flows into the basket containment vessel 51 through the top opening of the basket 50. At the same time, the boric acid solution is retained in the basket containment vessel 51, which inundates the basket 50 contained in the basket containment vessel 51. That is, the top opening of the basket 50 works as an inlet for the boric acid solution.

An outlet of the basket containment vessel 51 is formed with the overflow pipe 52. The overflow pipe 52 is formed substantially in an inverted U shape. That is, the overflow pipe 52 has its beginning at the bottom of the basket containment vessel 51, extending upward from the beginning along the inside wall of the basket containment vessel 51, and is turned in a horizontal direction at the top of the outside wall of the basket containment vessel 51, passing through the top of the outside wall. The overflow pipe 52 that passed through the outside wall extends downward along the outside wall of the basket containment vessel 51, and its end is connected to the fuel-replacement water pit 35.

The vent pipe 53 is formed substantially in an inverted J shape, and is provided on the top of the overflow pipe 52, causing the inside and the outside of the overflow pipe 52 to be communicated with each other. With this configuration, the vent pipe 53 opens the inside of the overflow pipe 52 to the atmosphere so that the inside of the overflow pipe 52 is not filled with the boric acid solution.

The basket 50 according to the first embodiment is explained next with reference to FIGS. 4 to 6. The basket 50 includes a basket frame 60 that is formed with a plurality of openings, a wire net 61 that is put on the basket frame 60, and four legs 62 that support the basket frame 60.

The basket frame 60 is formed in a rectangular cuboid shape. A rectangular upper surface opening 65 and a rectangular lower surface opening 66 are formed on the upper surface and the lower surface of the basket frame 60, respectively. The wire net 61 with coarse mesh is put on the upper surface opening 65, and the wire net 61 with fine mesh is put on the lower surface opening 66 (see FIG. 4). The wire net 61 with fine mesh causes the pH adjuster that is dissolved in the boric acid solution (a pH adjuster solution) to pass through the wire net while keeping the pH adjuster in the form of powder from passing through the wire net.

A rectangular side surface opening 67 is formed on each of four side surfaces of the basket frame 60, and seven divided side surface openings 70 are formed on each of the four side surface openings 67 by arranging six horizontal frames 68, which extends in the horizontal direction, at predetermined intervals in a vertical direction. That is, the seven divided side surface openings 70 are formed in a stacked manner in the vertical direction, so that each of the divided side surface openings 70 is opened to extend in the horizontal direction. Among the seven divided side surface openings 70 arranged in a stacked manner in the vertical direction, the wire net 61 with fine mesh is put on each of four divided side surface openings 70 including the first, the third, the fifth, and the seventh from the top, and the rest of three divided side surface openings 70 including the second, the fourth, and the sixth from the top are remained in the opened state as they are.

The six horizontal frames 68 are arranged on each of the side surface openings 67 on its four walls, and the first four horizontal frames 68 from the top on the side surface openings 67 on the four walls form a frame surrounding in the four directions. The wire net 61 with fine mesh is put on within this frame. The other layer four horizontal frames 68 from the top on the side surface openings 67 on the four walls similarly form a frame surrounding in the four directions, and the wire net 61 with fine mesh is put on within the frame. That is, six wire nets 61 are put on between the wire net 61 put on the top and the wire net 61 put on the bottom (see FIGS. 5 and 6).

Therefore, in the basket 50, four spaces of rectangular cuboid shape partitioned by the wire nets 61 are formed in a stacked manner in the vertical direction, and each of the four spaces works as a containment unit 71 that contains the pH adjuster. That is, four containment units 71 are arranged with a predetermined first space L1 in a stacked manner in the vertical direction.

The four legs 62 that support the basket frame 60 are provided at four corners on the bottom surface, which is integrally formed with the basket frame 60.

A series of operations in the pH adjusting system 30 described above is explained. When an unusual event occurs, the spray device 36 is activated. That is, the spray pump 46 is activated to pump the boric acid solution from the fuel-replacement water pit 35. The pumped boric acid solution is then sprayed on the inside of the reactor containment vessel 10 via the spray ring 45. At this time, a part of the boric acid solution sprayed from the spray ring 45 flows into the pH adjusting device 37, and the rest of the boric acid solution cools down the inside of the reactor containment vessel 10.

When the boric acid solution is sprayed on the pH adjusting device 37, the boric acid solution flows into the basket containment vessel 51. The boric acid solution then dissolves the pH adjuster stored in the basket 50 to produce the pH adjuster solution. The basket containment vessel 51 is finally filled with the boric acid solution and the pH adjuster solution in which the pH adjuster is dissolved, by which the basket 50 is inundated.

At this time, because the four containment units 71 are arranged with the first space L1 in a stacked manner in the vertical direction, the basket 50 can cause the boric acid solution to flow into three first spaces L1, making it possible to increase a contact dimension between the boric acid solution and the pH adjuster. As a result, it is possible to speed up the rate of solution of the pH adjuster.

The pH adjuster solution produced in the above manner flows into the fuel-replacement water pit 35 by free fall through the overflow pipe 52. The pH adjuster solution that flows into the fuel-replacement water pit 35 is mixed with the boric acid solution in the fuel-replacement water pit 35. Thereafter, the boric acid solution mixed with the pH adjuster solution in the fuel-replacement water pit 35 is pumped by the spray pump 46, and the pumped boric acid solution is sprayed on the inside of the reactor containment vessel 10 via the spray ring 45. With this mechanism, by circulating the pH adjuster solution inside the reactor containment vessel 10, the pH in the reactor containment vessel 10 is adjusted, and at the same time, the inside of the reactor containment vessel 10 is cooled down.

With the above configuration, in the basket 50, it is possible to speed up the rate of solution of the pH adjuster by arranging the containment units 71 each containing the pH adjuster with the first space in a stacked manner in the vertical direction. Therefore, it is possible to perform a circulation of the pH adjuster solution in the reactor containment vessel 10 quickly, and as a result, it is possible to settle down the unusual event quickly.

Second Embodiment

Figure 7:
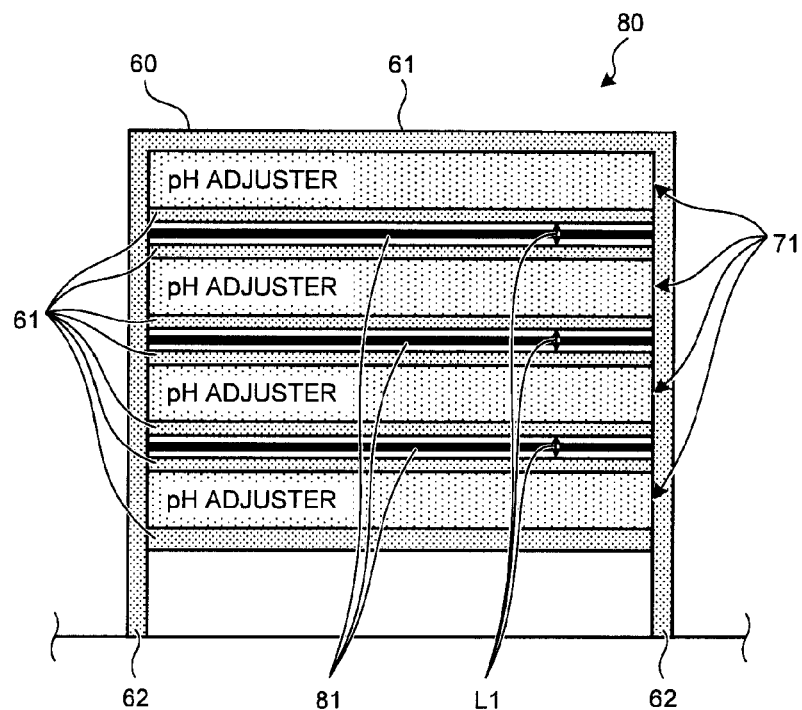
FIG. 7 is a cross section of a basket according to a second embodiment cut on the plane A shown in FIG. 4.
Figure 8:
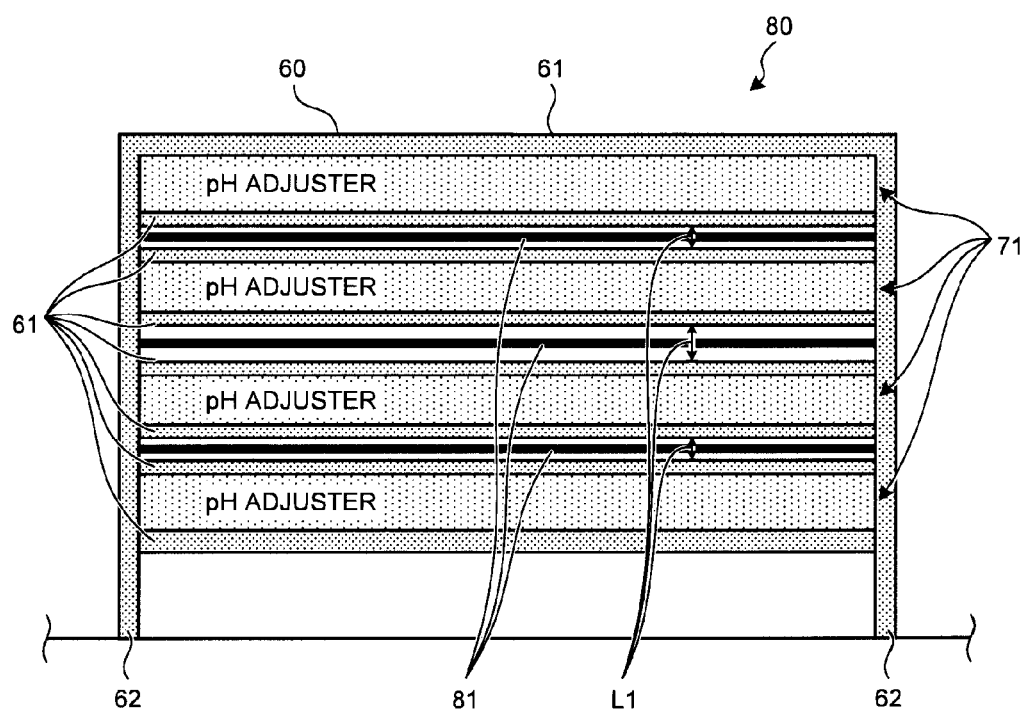
FIG. 8 is a cross section of the basket according to the second embodiment cut on the plane B shown in FIG. 4.

A basket 80 according to a second embodiment is explained next with reference to FIGS. 7 and 8. To avoid redundant descriptions, only different contents are explained. FIG. 7 is a cross section of the basket according to the second embodiment cut on the plane A shown in FIG. 4, and FIG. 8 is a cross section of the basket according to the second embodiment cut on the plane B shown in FIG. 4. FIGS. 7 and 8 are the cross sections of the basket 80 according to the second embodiment cut along the cutting positions shown in FIG. 4, not the cross sections of the basket 50 according to the first embodiment. The basket 80 according to the second embodiment has a configuration in which a plurality of partition plates 81 are provided between the containment units 71.

Specifically, as shown in FIGS. 7 and 8, the three first spaces L1 are formed between the containment units 71, and the metal partition plate 81 is provided in each of the first spaces L1. Each of three partition plates 81 is arranged to make a horizontal plane, and is mounted on the basket frame 60 to be located at the center of the first space L1 in the vertical direction. With this configuration, each of the partition plates 81 can suppress inflow of the pH adjuster solution that flows out from each of the containment units 71 located above into each of the containment units 71 located below.

With the above configuration, because a solution other than the pH adjuster solution of high concentration that flows out from each of the containment units 71 located above each of the partition plates 81 flows into each of the containment units 71 located below, a saturation of the pH adjuster solution hardly occurs in the containment units 71 located below, which makes it possible to appropriately dissolve the pH adjuster. As a result, it is possible to further speed up the rate of solution of the pH adjuster.

Third Embodiment

Figure 9:
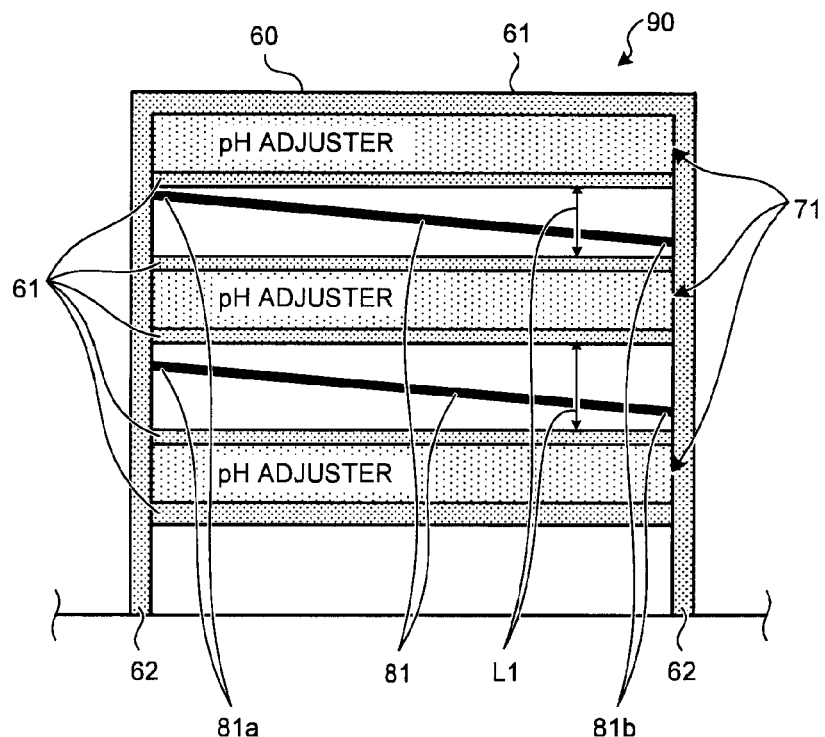
FIG. 9 is a cross section of a basket according to a third embodiment cut on the plane A shown in FIG. 4.
Figure 10:
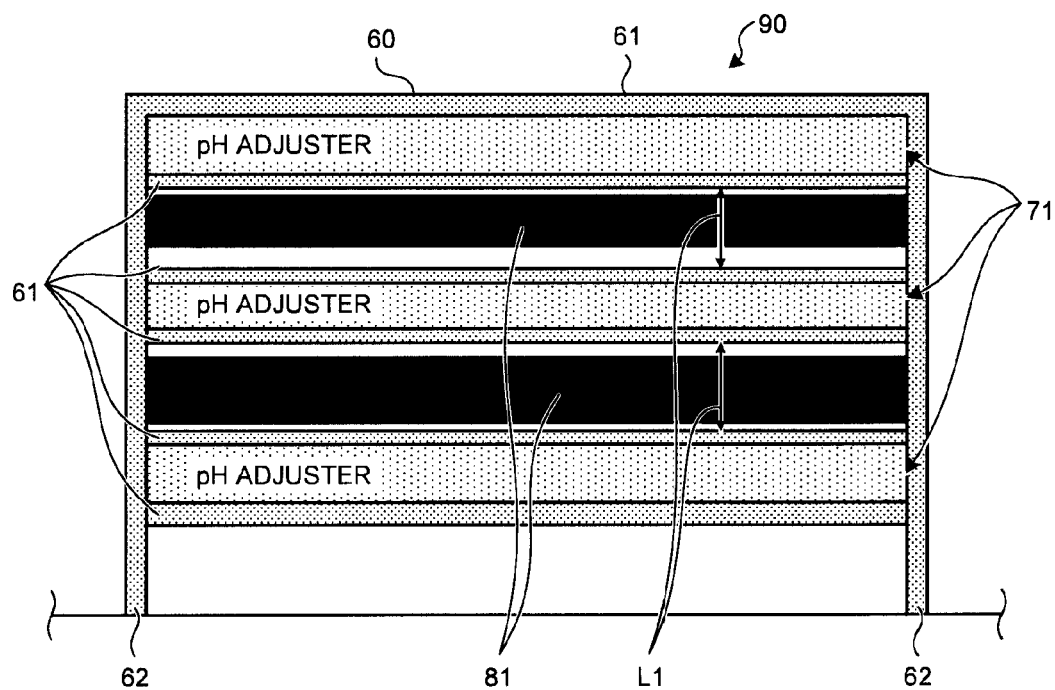
FIG. 10 is a cross section of the basket according to the third embodiment cut on the plane B shown in FIG. 4.

A basket 90 according to a third embodiment is explained next with reference to FIGS. 9 and 10. Also in this case, to avoid redundant descriptions, only different contents are explained. FIG. 9 is a cross section of the basket according to the third embodiment cut on the plane A shown in FIG. 4, and FIG. 10 is a cross section of the basket according to the third embodiment cut on the plane B shown in FIG. 4. FIGS. 9 and 10 are the cross sections of the basket 90 according to the third embodiment cut along the cutting positions shown in FIG. 4, not the cross sections of the basket 50 according to the first embodiment. The basket 90 according to the third embodiment has a configuration in which the partition plates 81 provided between the containment units 71 of the basket 80 according to the second embodiment are inclined with respect to the horizontal plane.

Specifically, as shown in FIGS. 9 and 10, the metal partition plate 81 is provided in each of the first spaces L1 between the containment units 71, and each of the three partition plates 81 is mounted on the basket frame 60 to be inclined with respect to the horizontal plane. With this arrangement, because one end (an upper side end 81*a*) of each of the partition plates 81 is higher than other end (a lower side end 81*b*), it is possible to lead the pH adjuster solution, which flows out from each of the containment units 71 located above, from the upper side end 81*a* toward the lower side end 81*b*.

With the above configuration, because each of the partition plates 81 is arranged in an inclined manner with respect to the horizontal plane, it is possible to lead the pH adjuster solution produced in each of the containment units 71 from the upper side end 81*a* of each of the partition plates 81 toward the lower side end 81*b*, and as a result, it is possible to cause the pH adjuster solution to flow out in a preferable manner.

Fourth Embodiment

Figure 11:
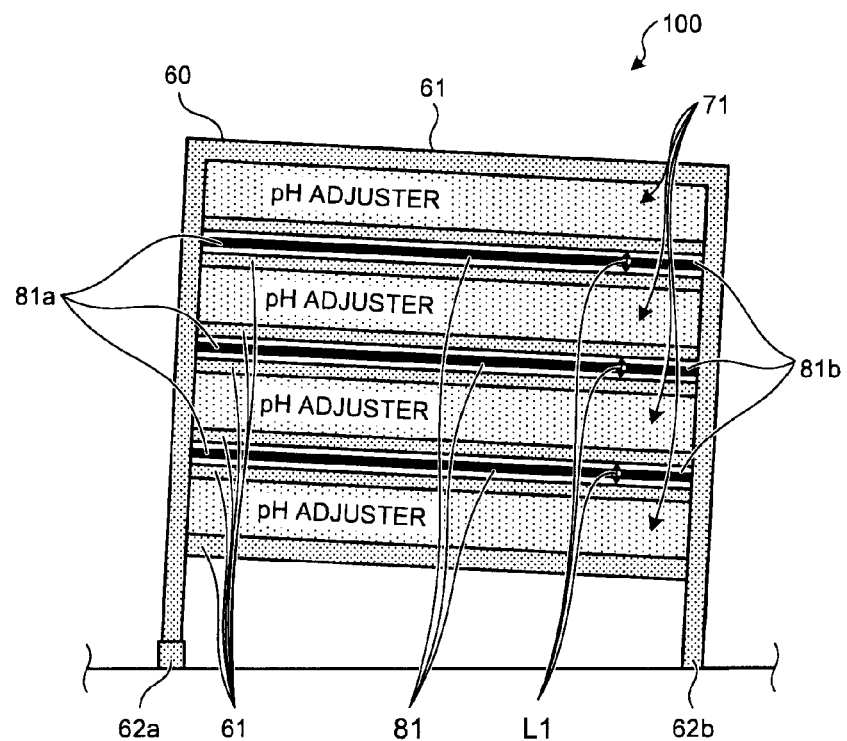
FIG. 11 is a cross section of a basket according to a fourth embodiment cut on the plane A shown in FIG. 4.
Figure 12:
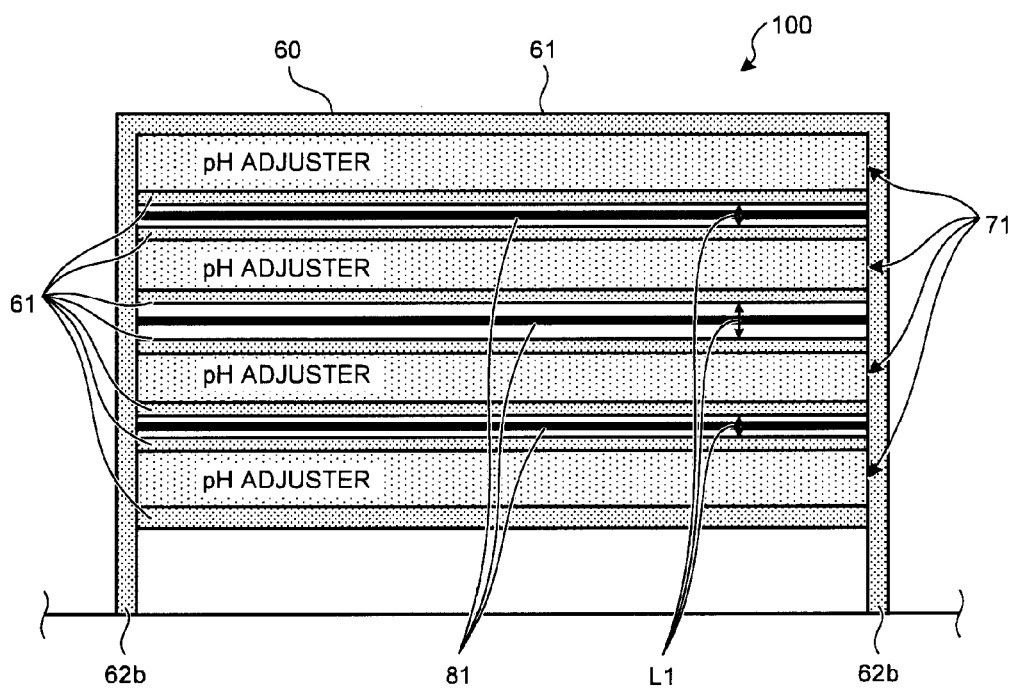
FIG. 12 is a cross section of the basket according to the fourth embodiment cut on the plane B shown in FIG. 4.

A basket 100 according to a fourth embodiment is explained next with reference to FIGS. 11 and 12. Also in this case, to avoid redundant descriptions, only different contents are explained. FIG. 11 is a cross section of the basket according to the fourth embodiment cut on the plane A shown in FIG. 4, and FIG. 12 is a cross section of the basket according to the fourth embodiment cut on the plane B shown in FIG. 4. FIGS. 11 and 12 are the cross sections of the basket 100 according to the fourth embodiment cut along the cutting positions shown in FIG. 4, not the cross sections of the basket 50 according to the first embodiment. The basket 100 according to the fourth embodiment has a configuration in which the basket 80 according to the second embodiment is provided in an inclined manner.

Specifically, as shown in FIGS. 11 and 12, the metal partition plate 81 is provided in each of the first spaces L1 between the containment units 71, and each of the three partition plates 81 is mounted on the basket frame 60 to make a horizontal plane. The four legs 62 of the basket 100 are configured in a manner such that lengths of two adjacent legs 62*a* are longer than lengths of other two legs 62*b*, so that each of the partition plates 81 is included with respect to the horizontal plane. With this arrangement, because one end (the upper side end 81*a*) of each of the partition plates 81 is higher than other end (the lower side end 81*b*), it is possible to lead the pH adjuster solution, which flows out from each of the containment units 71 located above, from the upper side end 81*a* toward the lower side end 81*b*.

With the above configuration, because each of the partition plates 81 can be arranged in an inclined manner with respect to the horizontal plane, it is possible to lead the pH adjuster solution produced in each of the containment units 71 from the upper side end 81*a* of each of the partition plates 81 toward the lower side end 81*b*, and as a result, it is possible to cause outflow of the pH adjuster solution in a preferable manner. Although the basket 100 is inclined by changing the lengths of the legs 62 in the fourth embodiment, which is not limited to, a floor surface on which the basket 100 is placed can be inclined instead with respect to the horizontal plane. That is, it is enough to simply incline each of the partition plates 81 with respect to the horizontal plane at the completion of installation of the basket 100.

Fifth Embodiment

Figure 13:
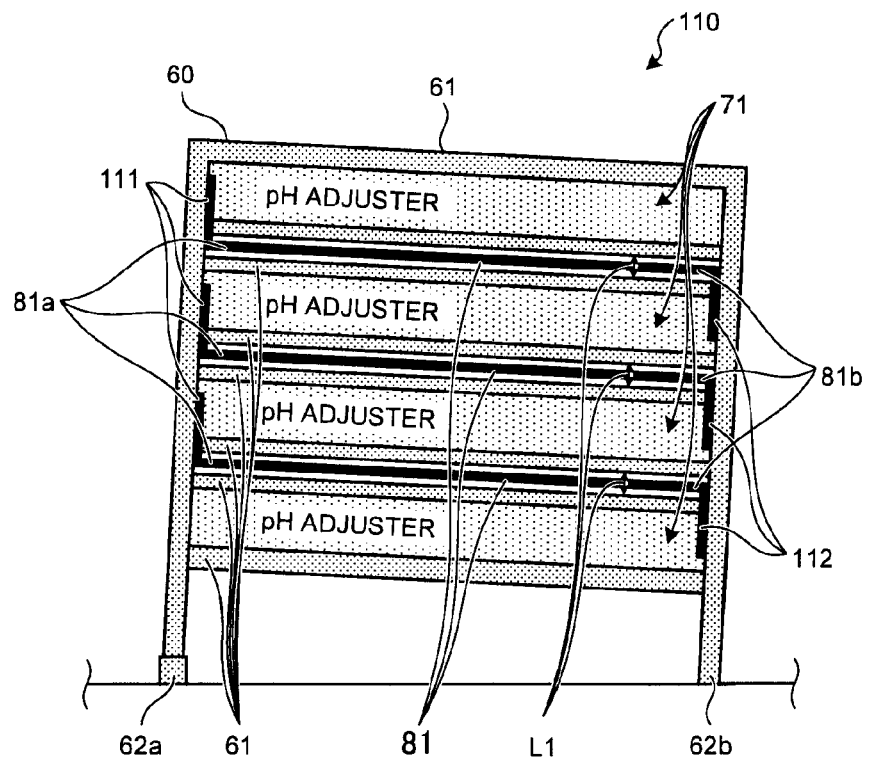
FIG. 13 is a cross section of a basket according to a fifth embodiment cut on the plane A shown in FIG. 4.
Figure 14:
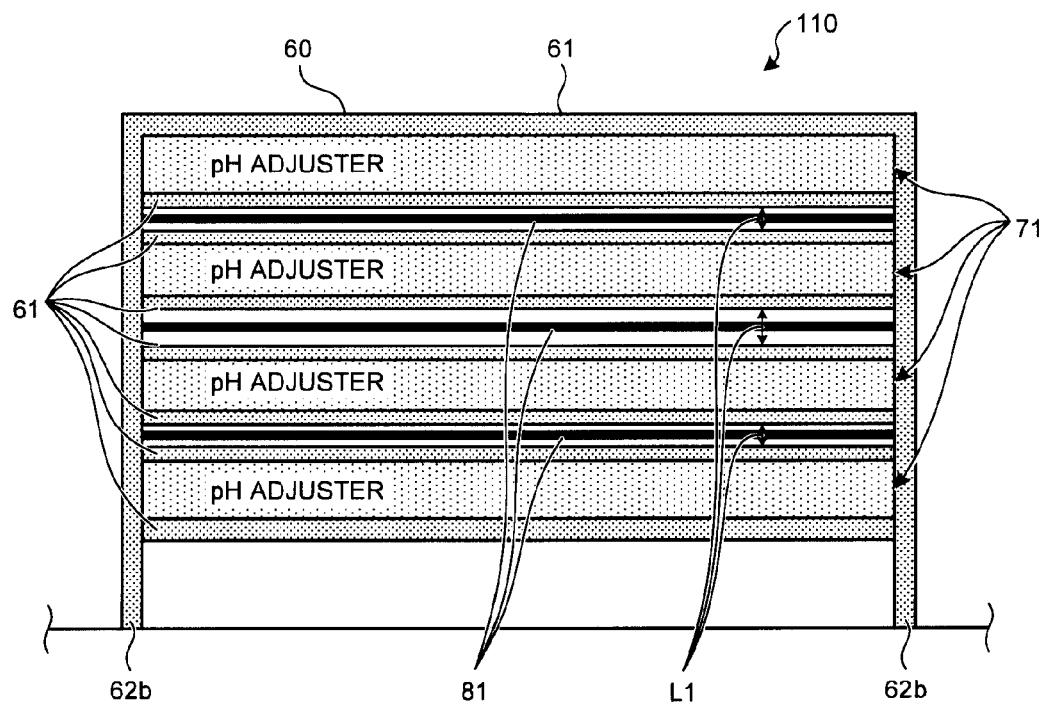
FIG. 14 is a cross section of the basket according to the fifth embodiment cut on the plane B shown in FIG. 4.

A basket 110 according to a fifth embodiment is explained next with reference to FIGS. 13 and 14. Also in this case, to avoid redundant descriptions, only different contents are explained. FIG. 13 is a cross section of the basket according to the fifth embodiment cut on the plane A shown in FIG. 4, and FIG. 14 is a cross section of the basket according to the fifth embodiment cut on the plane B shown in FIG. 4. FIGS. 13 and 14 are the cross sections of the basket 110 according to the fifth embodiment cut along the cutting positions shown in FIG. 4, not the cross sections of the basket 50 according to the first embodiment. The basket 110 according to the fifth embodiment has a configuration in which an inflow guide plate 111 is provided on the upper side end 81*a* of each of the partition plates 81 of the basket 100 according to the fourth embodiment, and an outflow guide plate 112 is provided on the lower side end 81*b* of each of the partition plates 81 of the basket 100 according to the fourth embodiment.

Specifically, as shown in FIGS. 13 and 14, the metal partition plate 81 is provided in each of the first spaces L1 between the containment units 71, and each of the three partition plates 81 is mounted on the basket frame 60 to make a horizontal plane. The inflow guide plate 111 formed in a plate shape extending upward in the vertical direction is provided on one end of each of the partition plates 81, and the outflow guide plate 112 formed in a plate shape extending downward in the vertical direction is provided on other end of each of the partition plates. The four legs 62 of the basket 100 are configured in a manner such that lengths of two adjacent legs 62*a* are longer than lengths of other two legs 62*b*, so that each of the partition plates 81 is included with respect to the horizontal plane. Therefore, each of the partition plates is inclined with respect to the horizontal direction, and each of the inflow guide plates 111 and each of the outflow guide plates 112 are inclined with respect to the vertical direction. At this time, the four legs 62 of the basket 110 are configured in a manner such that the one end (the upper side end 81*a*) on which the inflow guide plate 111 is provided is higher than the other end (the lower side end 81*b*) on which the outflow guide plate 112 is provided.

With the above configuration, by providing the inflow guide plate 111, it is possible to guide the solution other than the pH adjuster solution of high concentration produced in other containment units 71 to appropriately flow into each of the containment units 71. In addition, by providing the outflow guide plate 112, it is possible to guide the pH adjuster solution of high concentration produced in each of the containment units 71 to appropriately flow out from each of the containment units 71 so that the pH adjuster solution does not flow into other containment units 71. The inflow guide plate 111 and the outflow guide plate 112 can be also applied to the basket 80 according to the second embodiment.

Sixth Embodiment

Figure 15:
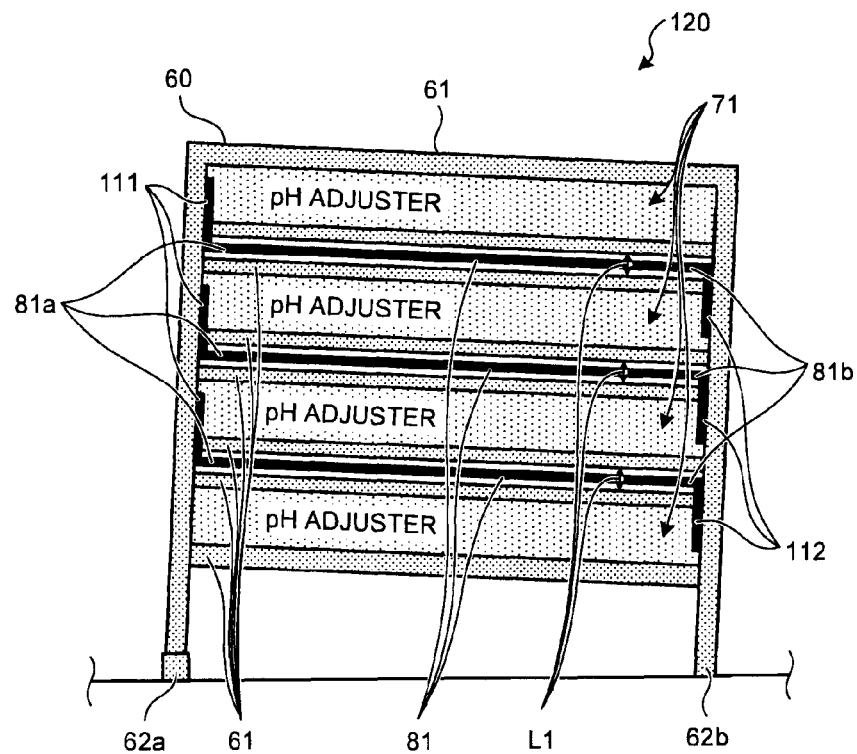
FIG. 15 is a cross section of a basket according to a sixth embodiment cut on the plane A shown in FIG. 4.
Figure 16:
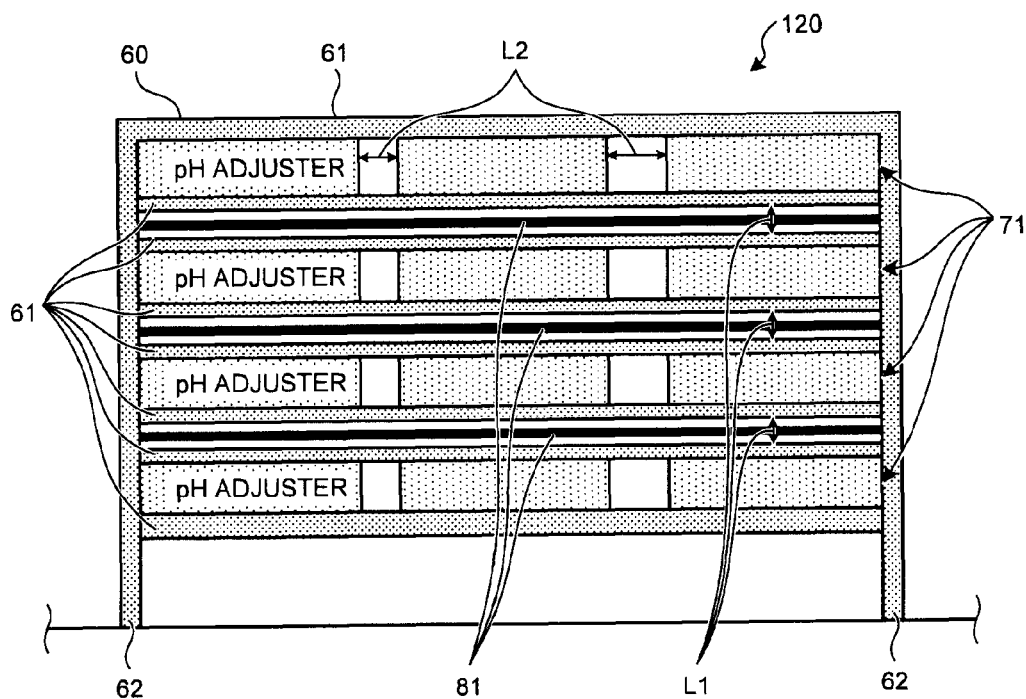
FIG. 16 is a cross section of the basket according to the sixth embodiment cut on the plane B shown in FIG. 4.

A basket 120 according to a sixth embodiment is explained next with reference to FIGS. 15 and 16. Also in this case, to avoid redundant descriptions, only different contents are explained. FIG. 15 is a cross section of the basket according to the sixth embodiment cut on the plane A shown in FIG. 4, and FIG. 16 is a cross section of the basket according to the sixth embodiment cut on the plane B shown in FIG. 4. FIGS. 15 and 16 are the cross sections of the basket 120 according to the sixth embodiment cut along the cutting positions shown in FIG. 4, not the cross sections of the basket 50 according to the first embodiment. The basket 120 according to the sixth embodiment has a configuration in which each of the containment units 71 of the basket 110 according to the fifth embodiment is divided by a predetermined second space L2.

Specifically, as shown in FIGS. 15 and 16, each of the containment units 71 arranged in a stacked manner in the vertical direction includes a plurality of divided containment units 122 divided by the predetermined second space L2 that is perpendicular to the first space L1. A plurality of second spaces L2 are formed to extend along a direction of flow of the pH adjuster solution. That is, because the pH adjuster solution produced in each of the containment units 71 flows in a direction of the inclination of each of the partition plates 81 that are inclined with respect to the horizontal plane, the second space L2 is formed to extend along the direction of the inclination of the partition plate 81.

With the above configuration, because it is possible to cause the boric acid solution to flow into the second space L2 between the divided containment units 122, it is possible to increase a contact dimension between the boric acid solution and the pH adjuster. Therefore, because it is possible to speed up the rate of solution of the pH adjuster, it is possible to perform a circulation of the pH adjuster solution in the reactor containment vessel 10 quickly, and as a result, it is possible to settle down the unusual event quickly. In addition, because the second spaces L2 are formed along the direction of flow of the pH adjuster solution, the boric acid solution flows into each of the divided containment units 122 through each of the second spaces L2, and at the same time, the pH adjuster solution produced in each of the divided containment units 122 flows out through each of the second spaces L2. With this mechanism, because it is possible to obtain efficient inflow of the boric acid solution and efficient outflow of the produced pH adjuster solution, it is possible to speed up the rate of solution of the pH adjuster. The second spaces L2 can be also applied to the baskets 50, 80, and 90 according to the first to third embodiments, respectively.

Figure 17:
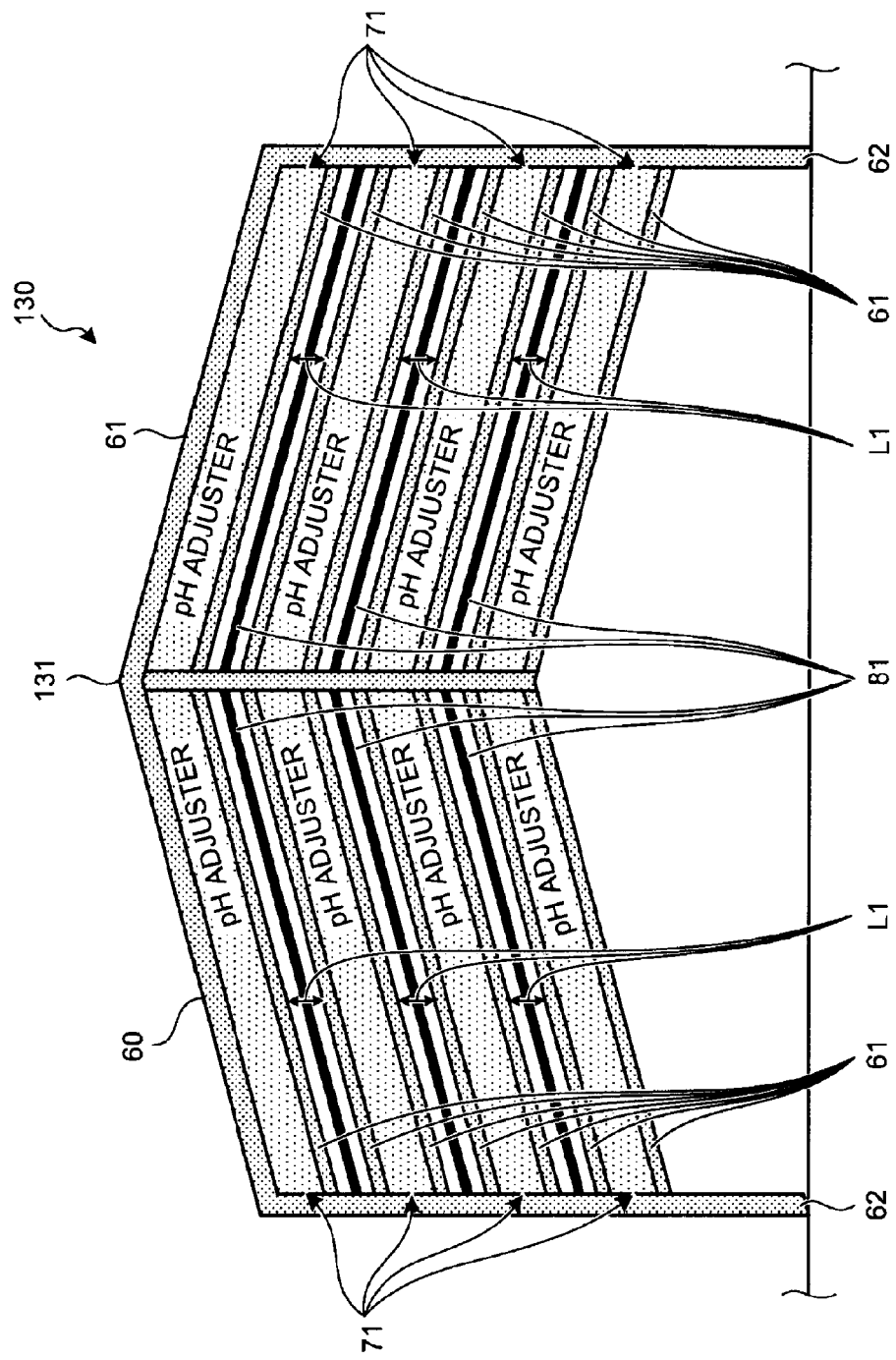
FIG. 17 is a cross section of a basket according to a modification cut on the plane B shown in FIG. 4.

FIG. 17 is a cross section of a basket according to a modification of the basket 80 according to the second embodiment cut on the plane B shown in FIG. 4. A basket 130 according to the modification has a configuration in which the center of the basket 130 is taken as an apex 131, and the containment units 71 and the partition plates 81 are formed in a manner such that they are inclined in a down-slope toward both sides from the apex 131. At this time, each of the containment units 71 can be divided symmetrically with respect to the apex 131. In addition, in the baskets 80, 90, 100, 110, and 120 according to the second to sixth embodiments, a flow path guide plate (not shown) that guides the pH adjuster solution from the upper side end 81a toward the lower side end 81b of each of the partition plates 81 can be provided on both sides in a width direction that is perpendicular to the direction of the inclination of each of the partition plates 81. With this arrangement, it is possible to guide the pH adjuster solution of high concentration produced in each of the containment units 71 from the upper side end 81a toward the lower side end 81b not to flow into other containment units 71.

Industrial Applicability

As described above, the basket and the pH adjusting device according to the present invention is useful for a pH adjusting device that adjusts pH in a reactor containment vessel, and are particularly suitable for a case of speeding up the rate of solution of a pH adjuster.

Explanations of Letters or Numerals 1 nuclear power plant
10 reactor containment vessel
30 pH adjusting system
35 fuel-replacement water pit
36 spray device
37 pH adjusting device
42 inspection stage
45 spray ring
46 spray pump
50 basket
51 basket containment vessel
52 overflow pipe
53 vent pipe
60 basket frame
61 wire net
62 leg
62a leg
62b leg
65 upper surface opening
66 lower surface opening
67 side surface opening
68 horizontal frame
70 divided side surface opening
71 containment unit
80 basket (second embodiment)
81 partition plate
81a upper side end
81b lower side end
90 basket (third embodiment)
100 basket (fourth embodiment)
110 basket (fifth embodiment)
111 inflow guide plate
112 outflow guide plate
120 basket (sixth embodiment)
122 divided containment unit
130 basket (modification)
131 apex
L1 first space
L2 second space

The invention claimed is:

1. A reactor containment vessel basket configured for placement in a reactor containment vessel that includes a spray device having a spray ring mounted near an inside ceiling of the reactor containment vessel so that the basket is subject to spray from the spray ring, the basket comprising:
  an upper surface opening which is formed on an upper surface of the basket;
  a lower surface opening which is formed on a lower surface of the basket and is covered by a mesh wire net; and
  a plurality of containment units arranged with predetermined first spaces in a stacked manner in a length direction, each of the containment units being configured to contain a pH adjuster and to allow for said spray from the spray ring to contact each of said plurality of containment units.

2. The basket according to claim 1, further comprising a plurality of partition plates respectively provided in the first spaces between the containment units.

3. The basket according to claim 2, wherein the partition plates are inclined with respect to a lateral direction.

4. The basket according to claim 3, further comprising a plurality of inflow guide plates which are formed in a plate shape extending upward in the height direction, respectively provided on an upper side end of the inclined partition plates, each of the inflow guide plates guiding the solvent that flows into each of the containment units.

5. The basket according to claim 3, further comprising a plurality of outflow guide plates which are formed in a plate shape extending downward in the height direction, respectively provided on a lower side end of the inclined partition plates, each of the outflow guide plates guiding the pH adjuster solution that flows out from each of the containment units.

6. The basket according to claim 1, wherein each of the containment units includes a plurality of divided containment units divided at predetermined second spaces perpendicular to the first spaces.

7. The basket according to claim 6, wherein the second spaces between the divided containment units are formed to extend along a flow direction of the pH adjuster solution.

8. A pH adjusting device including the basket according to claim 1 comprising:
a cooling water inflow vessel that is configured to contain the basket therein and that is configured to store cooling water therein; and
a cooling water outflow unit that causes the pH adjuster solution produced from the pH adjuster dissolved in the cooling water in the cooling water inflow vessel to flow out.

9. The basket according to claim 1, wherein
the upper surface opening is covered with a coarse mesh wire net, and
the mesh wire net of the lower surface opening is finer than the coarse mesh wire net.

\* \* \* \* \*